Figure 3:
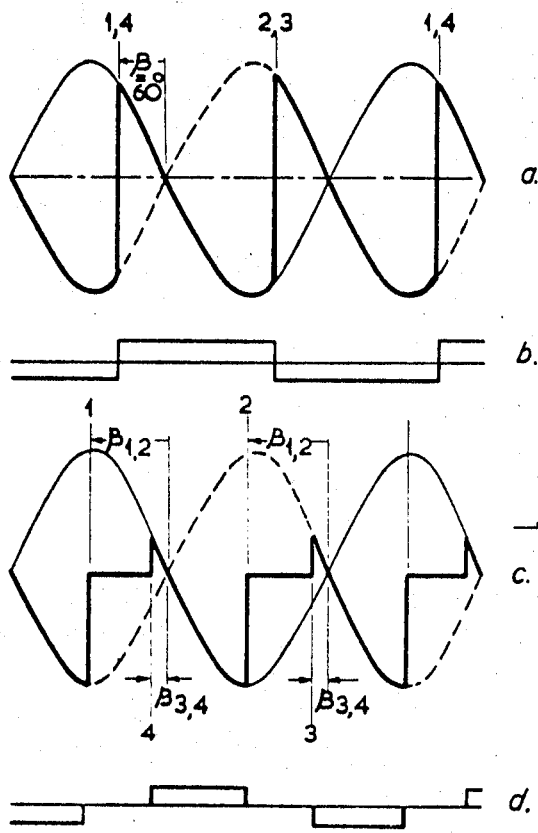

United States Patent

[11] 3,586,960

| | | |
|---|---|---|
| [72] | Inventor | Narain G. Hingorani<br>4307, N.E. Flanders, Portland, Oreg. 97213 |
| [21] | Appl. No. | 806,135 |
| [22] | Filed | Mar. 11, 1969 |
| [45] | Patented | June 22, 1971 |
| [32] | Priority | Mar. 22, 1968 |
| [33] | | Great Britain |
| [31] | | 13961/68 |

[54] CONTROL ARRANGEMENT FOR SINGLE PHASE BRIDGE CONVERTER
4 Claims, 8 Drawing Figs.

[52] U.S. Cl. .................................................. 321/9,
321/18, 321/38, 321/40
[51] Int. Cl. ...................................................... H02m 1/12,
H02m 1/08

[50] Field of Search.......................................... 321/9, 18,
32, 38, 40, 46, 60, 65

[56] References Cited
UNITED STATES PATENTS

| 2,155,251 | 4/1939 | Bedford.................... | 321/40 |
| 2,222,700 | 11/1940 | Bedford.................... | 321/40 |
| 3,270,272 | 8/1966 | Kurimura.................. | 321/40 X |

Primary Examiner—William H. Beha, Jr.
Attorney—Holman and Stern

ABSTRACT: In an AC/DC or DC/AC electric converter using controllable rectifiers in the four arms of a single phase bridge arrangement, the firing angle, of the rectifiers in one pair of adjacent arms is controlled separately from that of the rectifiers in the other pair of adjacent arms to provide a reduction in harmonics and an improvement in the power factor.

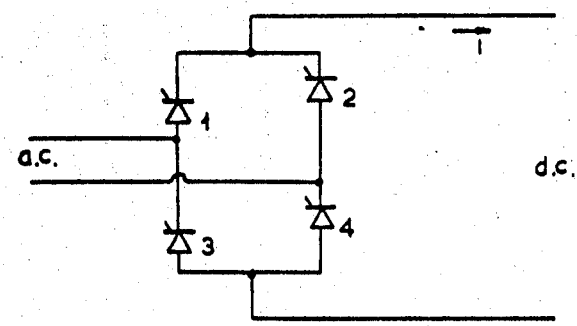
FIG.1
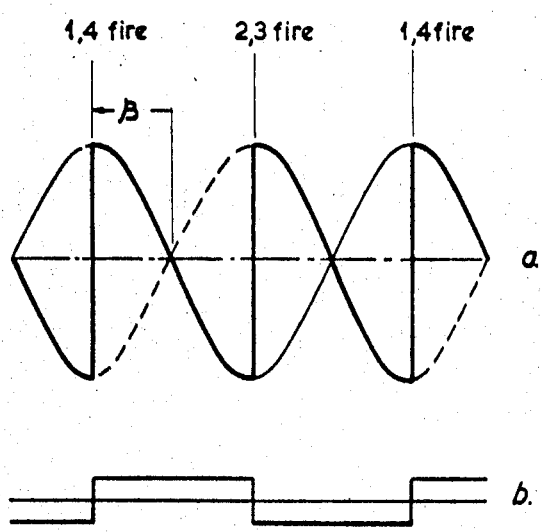
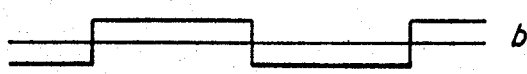
FIG.2
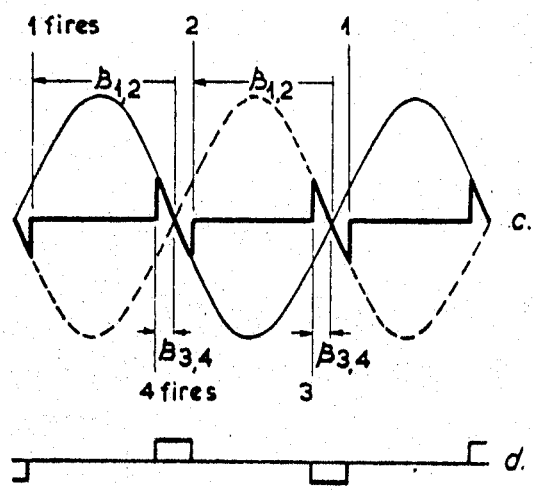
INVENTOR
N. G. HINGORANI
By Holman, Glascock, Downing & Seebold
ATTORNEYS

CONTROL ARRANGEMENT FOR SINGLE PHASE BRIDGE CONVERTER

This invention relates to AC/DC on DC/AC controlled converters using mercury arc valves, semiconductor valves or any other type of controllable valves. Among such converter circuits, the single phase bridge circuit is a well known and widely used circuit. This invention is concerned with the control of this circuit. A single phase bridge circuit comprises four arms each of which includes a valve, or a series-parallel combination of several valves so to meet the required converter capacity. Since valves in one arm would fire simultaneously and effectively work as one valve, only one valve per arm will be discussed for the purpose of explaining the present invention, although it equally applied to circuits with more than one valve per arm.

In a conventional mode of control of a single phase bridge converter, in which each arm is controlled, a first pair of diagonally opposite valves, are fired simultaneously and in turn the second pair of diagonally opposite valves are fired simultaneously, at a certain angle of delay $\alpha$ or an angle of advance $\beta=180°-\alpha$, where angle of delay $\beta$ is the angle between the point when a valve voltage passes zero while going from negative to positive, and the point when valve is fired. The firing angle is often referred to in terms of angle of advance $\beta$ which is the angle between the point when a valve is fired and the next valve voltage zero. Control of firing angle is carried out by a controller which is common for all the valves, and is operated manually or automatically. Assuming that the first pair of valves are conducting, then when the second pair of valves fire at an angle of advance $\beta$, commutation of current takes place after which the second pair of valves are conductive. Subsequently, the first pair of valves fire simultaneously with an angle of advance $\beta$ and commutation takes place so that the first pair conduct again and so on. Neglecting commutation angle, the DC output voltage is approximately proportional to cos $\alpha$ and contains a substantial proportional of harmonics which increase with $\alpha$ approaching 90°. The AC current flowing into or from the AC system also contains a substantial proportion of harmonics and has a power factor which is approximately proportional to cos $\alpha$;

The object of the present invention is to provide a method of control, which results in a substantial improvement in the converter performance in the way of reduced harmonics in the output voltage and AC current, and an improvement in the power factor of the AC current.

In the present invention, it is proposed to control the firing angle of the two arms with common cathode, separately from the other two arms with common anode, i.e. it is proposed to control the angle of advance $\beta_{1,2}$ for valves 1 and 2 separately from the angle of advance $\beta_{3,4}$ for valves 3 and 4. One of the angles, say $\beta_{3,4}$, is kept at a small value preferably at its minimum permissible value and increased above this value when the output voltage is required to be increased positively and also when the other angle, $\beta_{1,2}$ is already or nearly at its maximum permissible value (usually 180°, but may be less in some applications); Whereas the other angle $\beta_{1,2}$ is kept at a large value, preferably at its maximum permissible value and decreased from this value when the output voltage is required to be increased negatively and also when $\beta_{3,4}$ is already or nearly at its minimum permissible value. The role of $\beta_{1,2}$ and $\beta_{3,4}$ described above is interchangeable.

There are available means for ensuring that the angle of advance does not fall below its minimum permissible value and it is not intended to discuss such means, since this invention concerns the control of the angles of advance $\beta$ within such permissible values.

Figure 7:
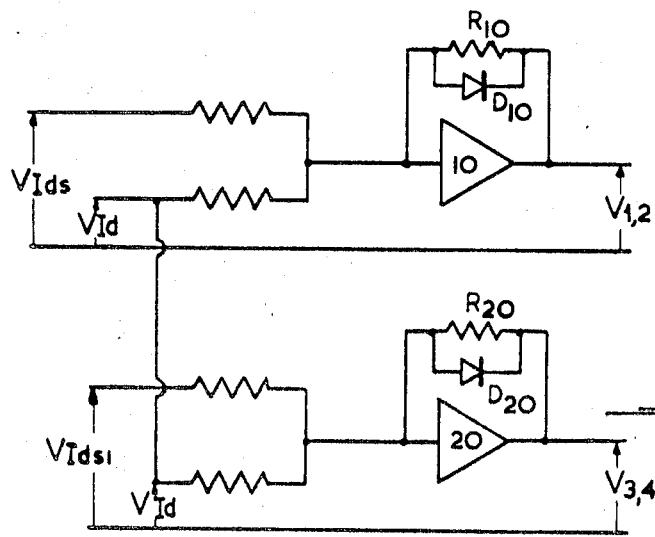
Figure 8:
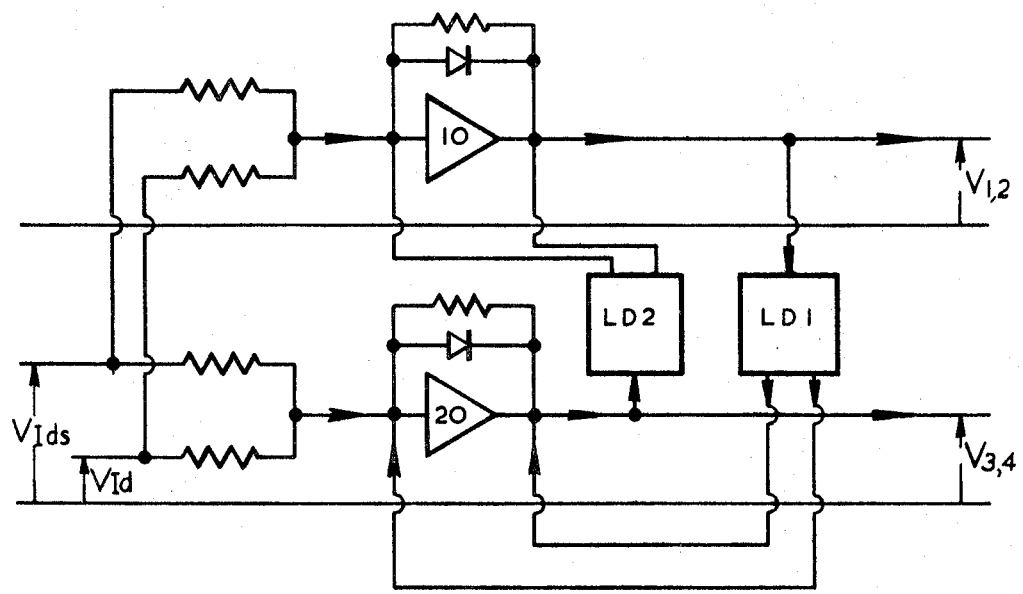

Embodiments of the invention will now be described by way of example, with reference to the accompanying drawings, in which:

FIG. 1 is a schematic circuit diagram of a single phase bridge circuit,

FIGS. 2, 3, 4, 5 and 6 show waveform diagrams represent the conduction of the valves of the bridge of FIG. 1 under various conditions for both known control arrangement and control arrangements in accordance with the invention, FIG. 7 is a schematic circuit diagram of a control arrangement in accordance with the invention, and FIG. 8 is a schematic circuit diagram of an alternative control arrangement in accordance with the invention.

The single phase bridge converter circuit shown in FIG. 1 comprises four arms, each of which includes a valve 1, 2, 3, 4 respectively. As previously stated there may be a multiple arrangement of valves in each arm but since the valves of any one arm are conductive and nonconductive together they may be considered as a single valve of the same combined current carrying capacity. The valves may be mercury arc valves, semiconductor valves or any other type of controllable valves or devices. The arrangement is such that valves 1 and 2 have commoned cathodes and valves 3 and 4 have commoned anodes.

In the known mode of operation of the converter, two diagonally opposite valves, say 1 and 4 are fired simultaneously and in turn valves 2 and 3 are fired simultaneously, with a certain angle of delay $\alpha$ or angle of advance $\beta$, where $\beta=180°-\alpha$. Assuming valves 1 and 4 are conducting, then when valves 2 and 3 fire at an angle of advance $\beta$, the commutation of current takes place from 1 to 2 and from 4 to 3 after which valves 2 and 3 continue to conduct.

In the conventional control, the output voltage (assuming continuous current) becomes zero when the angle of advance $\beta$ is 90° (neglecting commutation angle). as shown in FIG. 2a. The output voltage becomes negative for decrease in $\beta$ to less than 90° and the converter operates as an inverter (i.e., power is fed from DC system to AC system and it is assuming that another source of DC supply maintains the direct current through the inverter). The negative voltage increases with decrease in $\beta$ and FIG. 3a shows −0.5 per unit output voltage for $\beta=60°$. Maximum negative voltage is obtained, FIG. 4, for minimum permissible $\beta$ which is just sufficient for safe commutation. When $\beta$ is increased to above 90°, the output voltage becomes positive and increases with increase in $\beta$ until maximum output voltage is obtained for maximum permissible $\beta$ (usually 180°), FIG. 5.

Figure 4:
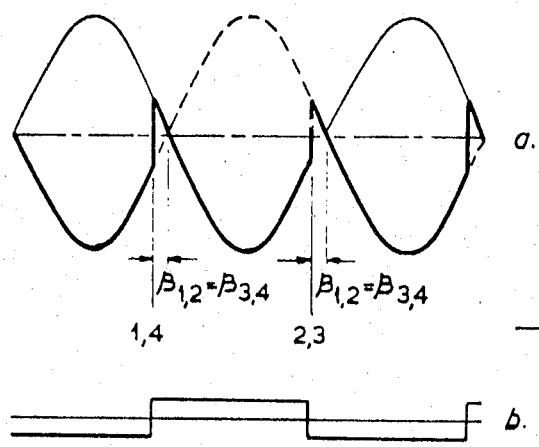
Figure 5:
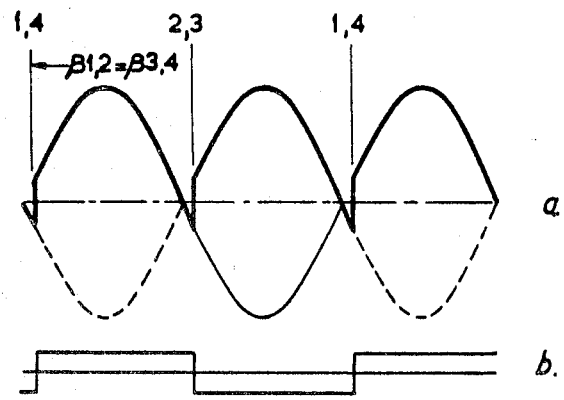
Figure 6:
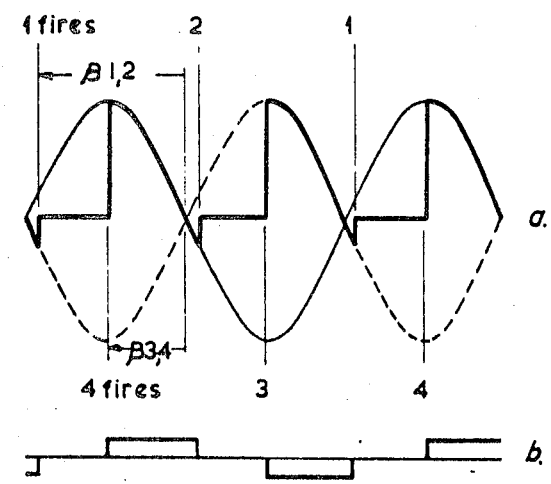

With the new control of the present invention, valves 1 and 2 are controlled together and valves 3 and 4 are controlled together, so that the maximum negative output voltage is the same as under conventional control, FIG. 4 when both $\beta_{1,2}$ and $\beta_{3,4}$ are at their minimum permissible value for safe operation. However under the new control, the negative output voltage is decreased from the maximum value by increasing only one of the angles, $\beta_{1,2}$, FIG. 3c shows −0.5 per unit output voltage under the new control and it is seen that the output voltage would contain much less harmonic than the corresponding output voltage of FIG. 3a under conventional control. FIG. 3d shows the corresponding AC current under the new control (assuming smooth direct current) and can be seen to have a lower r.m.s. value (implying improved power factor) and lower harmonics compared to the corresponding AC current under the conventional control (FIG. 3b).

Negative output voltage is further decreased by further increase in $\beta_{1,2}$. FIG. 2c shows the waveform for zero output voltage and FIG. 2d shows the corresponding AC current under the new control. For positive voltage, $\beta_{1,2}$ is allowed to increase. When $\beta_{1,2}$ reaches its maximum permissible value $\beta_{3,4}$ is increased in order to further increase the positive output voltage; FIG. 6a shows +0.5 per unit output voltage and FIG. 6b shows the corresponding AC current waveform under the new control. When $\beta_{3,4}$ also reaches its maximum permissible value, the output voltage reaches its maximum positive value and the waveform is the same as under the conventional control (FIG. 5a).

It may be mentioned that the control of $\beta_{1,2}$ and $\beta_{3,4}$ need not be carried out as accurately as described above. For example, $\beta_{3,4}$ may start increasing before $\beta_{1,2}$ has actually reached its maximum permissible value. This will reduce the amount of benefit that can be obtained from the proposed control, but may well make the control circuit design much more easy.

As the conventional control can be obtained by a variety of grid control circuit arrangements, both manual and automatic, in the same way the new control may be obtained by a variety of grid control circuits. Generally speaking all the available grid control circuits may be suitable for the new control, with the provision of effectively separate phase-shifting means for valve pairs 1, 2 and 3, 4 as compared to the conventional arrangement in which all four valves have effectively common phase-shifting means.

For automatic control, $\beta_{1,2}$ and $\beta_{3,4}$ may be required to be controlled for effectively controlling any of the variety of system quantities such as power, current, voltage, frequency, etc. For the purpose of presenting a possible practical control circuit for these specifications, it is assumed that the purpose of control is to maintain the direct current to a certain set of value. This is a conventional control arrangement which would be carried out by a feedback amplifier which amplifies the difference between a voltage representing the set current $I_{ds}$ and another voltage representing actual current representing $I_d$. The amplified output voltage is used to control $\beta$ for all valves, so as to change the output voltage in the direction which will counteract the change in current. For a practical amplifier with a finite gain the actual current would differ by a small amount, from the set value $I_{ds}$ for the amplifier output to be sufficient to cause the phase device to change from minimum to maximum permissible values.

For a practical scheme for the new control, it is proposed to provide two separate amplifiers, one for controlling $\beta_{1,2}$ and the other for $\beta_{3,4}$. The amplifier for $\beta_{1,2}$ is given a current setting of $I_{ds}$ whereas the amplifier for $\beta_{3,4}$ is given a current setting of $I_{ds_1}$ which differs from $I_{ds}$ by an estimated amount which will cause $\beta_{1,2}$ to swing from its maximum permissible value to minimum permissible value. Thus when $\beta_{1,2}$ acquires its maximum value, $\beta_{3,4}$ will begin to increase. FIG. 7 shows the circuit diagram for this control.

Amplifiers 10 and 20 shown in block form with a feedback resistances R10 and R20 respectively are well-known devices, and diodes D10 and D20 (usually referred to as "clamping diode"), connected across the feedbacks are also a well-known way of ensuring one-sided amplifications only, i.e. amplifier 10 will give an amplified output $V_{1,2}$ when input voltage $V_{Id}$ proportional to $I_d$ is less than $V_{Id_s}$, the voltage proportional to the current setting $I_{d_s}$, but the output will be zero when $V_{Id}$ is greater than $V_{Id_s}$. Similarly amplifier 20 will give an amplified output $V_{3,4}$ only when $V_{Id}$ is less than $V_{Id_{s_1}}$. Outputs $V_{1,2}$ and $V_{3,4}$ are used for increasing the angle of advance $\beta_{1,2}$ and $\beta_{3,4}$ respectively. There are many known grid control circuits which can be used for this purpose. $V_{Id_s}$ is somewhat greater than $V_{Id}$. If A is the amplification factor and $V_{1,2m}$ is that value of $V_{1,2}$ which causes the maximum permissible phase advance, then $V_{Id_{s_1}}$ is less than $V_{Id_s}$ by an amount ($V_{1,2m}/A$). The effect of this is that output $V_{3,4}$ remains zero until $V_{1,2}$ has reached $V_{1,2m}$.

Since angle of delay $\alpha$ is equal to 180° minus the angle of advance $\beta$, the above system may well be arranged in terms of angle of delay. This can be done by reversing the amplifier diodes using the output voltages $V_{1,2}$ and $V_{3,4}$ to increase the angle of delay $\alpha_{1,2}$ for valves 1 and 2 and $\alpha_{3,4}$ for valves 3 and 4 respectively. The effect of this is that $V_{1,2}$ remains zero until $V_{3,4}$ has reached $V_{3,4m}$, i.e. $V_{Id}$ exceeds $V_{Id_s}$, $\alpha_{3,4}$ begins to increase and when $\alpha_{3,4}$ reaches its maximum permissible value (corresponding to $V_{3,4m}$), then $\alpha_{1,2}$ begins to increase.

Feedback resistors and/or clamping facility (for one-sided damping) may well be a part of commercially available amplifier, in which case external feedback resistor and/or clamping diode will not be needed. The value of the feedback resistor will depend upon the required amplification factor A, which in turn is decided by the converter system considerations.

FIG. 8 shows another arrangement for obtaining the necessary grid control signals $V_{1,2}$ and $V_{3,4}$. This arrangement also includes two feedback amplifiers but both are given the same current setting $I_{ds}$. Both amplify the difference between the $V_{Id_s}$, the voltage proportional to the required current $I_{ds}$ and $V_{Id}$, the voltage proportional to the actual current.

When $V_{Id}$ falls below $V_{Id_s}$, amplifier 20 gives an output $V_{3,4}$. This output level is fed into the level detector LD2 which clamps the output of amplifier 10 as long as $V_{3,4}$ is less than the value required for advancing $\beta_{3,4}$ to its maximum. Thus output $V_{1,2}$ from amplifier 1 is zero as long as output $V_{3,4}$ is less than the set value, i.e., $\beta_{1,2}$ is at its minimum permissible as long as $\beta_{3,4}$ is not at its maximum permissible. $V_{1,2}$ is allowed to increase by level detector LD2 when $V_{3,4}$ reaches its maximum. Now when the output $V_{1,2}$ becomes finite, level detector LD1 senses this and clamps the output of amplifier 2 to its maximum. Thus $V_{3,4}$ is held at its maximum, as long as $V_{1,2}$ is finite, i.e., $\beta_{3,4}$ remains at its maximum permissible as long as $\beta_{1,2}$ is not at its minimum permissible.

Level detectors, feedback amplifiers and clamping methods are well-known devices and presentation of their detailed component arrangement is not necessary here. Also feedback circuit for the amplifier may be of different kind and would generally depend upon the dynamic properties of the system under control. However, feedback details are not relevant to this invention.

What I claim is:

1. A control arrangement for a single-phase bridge converter comprising four arms, each of which includes a conductive controllable device having in effect an anode, a cathode and a control electrode, the arrangement being such that the firing angle of a pair of adjacent arms in which the device cathodes are commoned is controlled separately from the firing angle of the other pair of adjacent arms in which the device anodes are commoned, said arrangement including two amplifiers, each including a feedback path shunted by a diode, the output of the other amplifier controlling the firing angle of the other pair of arms and means for comparing at the input of each amplifier signals representative of the actual output of the converter against a set value, the set value output of the converter against a set value, the set value of one amplifier differing from the set value for the other amplifier by an amount which causes the output of the amplifier having the lower set value to swing from maximum permissible value to minimum permissible value.

2. A control arrangement as claimed in claim 1, wherein the firing angle of one pair of arms is quiescent at a small value and is increased above this value when the output voltage is to be varied in one sense and when the firing angle of the other pair of arms is at or near its maximum permissible value, and wherein the firing angle of said other pair of arms is quiescent at a large value and is decreased from this value when the output voltage is to be varied in the other sense and when the firing angle of the first-mentioned pair of arms is at or near its minimum permissible value.

3. A control arrangement as claimed in claim 2, wherein the first-mentioned pair of arms have commoned anodes and increasing the firing angle thereof provides an increase in the output voltage in a positive direction, and the other pair of arms have commoned cathodes and decreasing the firing angle thereof provides a decrease in output voltage in the negative direction.

4. A control arrangement for a single-phase bridge converter comprising four arms, each of which includes a conductive controllable device having in effect an anode, a cathode and a control electrode, the arrangement being such that the firing angle of a pair of adjacent arms in which the device cathodes are commoned is controlled separately from the firing angle of the other pair of adjacent arms in which the device anodes are commoned, said arrangement including two amplifiers, each including a feedback path shunted by a diode, the output of one amplifier controlling the firing angle of one pair of arms and the output of the other amplifier controlling the firing angle of the other pair of arms, means for comparing at the input of each amplifier signals representative of the actual output of converter against a set value, and level detector means for clamping the output of each amplifier so that the output of one amplifier is clamped to zero until the other amplifier reaches maximum output and then the output of said other amplifier is clamped at maximum so long as the first-mentioned amplifier has an output above zero.